(12) United States Patent
Boetzel et al.

(10) Patent No.: US 7,260,359 B2
(45) Date of Patent: Aug. 21, 2007

(54) METHOD FOR TRANSMISSION OF DATA BETWEEN A MASTER STATION AND A SLAVE STATION, AND A DATA TRANSMISSION SYSTEM

(75) Inventors: Ulrich Boetzel, Kaarst (DE); Thomas Convent, Issum-Sevelen (DE); Roland Hellfajer, Bochum (DE); Michael Warmers, Erkelenz (DE)

(73) Assignee: Infineon Technologies AG, Munich (DE)

( * ) Notice: Subject to any disclaimer, the term of this patent is extended or adjusted under 35 U.S.C. 154(b) by 478 days.

(21) Appl. No.: 10/775,838

(22) Filed: Feb. 10, 2004

(65) Prior Publication Data

US 2004/0185779 A1    Sep. 23, 2004

Related U.S. Application Data

(63) Continuation of application No. PCT/DE02/02377, filed on Jul. 1, 2002.

(30) Foreign Application Priority Data

Aug. 10, 2001    (DE) .............................. 101 39 342

(51) Int. Cl.
*H04B 7/00* (2006.01)

(52) U.S. Cl. .................. 455/41.2; 455/41.3; 370/338; 370/321; 370/337

(58) Field of Classification Search ............ 455/41.2, 455/41.3; 370/328, 338, 321, 337
See application file for complete search history.

(56) References Cited

U.S. PATENT DOCUMENTS 5,806,007 A * 9/1998 Raith et al. ................. 455/574
6,975,613 B1 * 12/2005 Johansson ................... 370/338
2003/0177187 A1 * 9/2003 Levine et al. ............... 709/205

FOREIGN PATENT DOCUMENTS

| EP | 1 052 867 A1 | 5/1999 |
| WO | WO95/29568 | 11/1995 |
| WO | WO97/15154 | 4/1997 |
| WO | WO 01/41348 | 6/2001 |

OTHER PUBLICATIONS

"MAC Scheduling Policies With Reduced Power Consumption and Bounded Packet Delays for Centrally Controlled TDD Wireless Networks"; I. Chakroborty et al. ICC 2001; 2001 IEEE International Conference Record, Helsinky, Finland Jun. 11-14, 2001.
"Bluetooth—The Universal Radio Interface for Ad Hoc, Wireless Connectivity"; J. Haarsten; On—Ericsson Review; Stockholm, SE, No. 3, 1998.
"Bluetooth Specification Version 1.1"; Steve Williams; Bluetooth Specification, Vol. Version, No. 1.1, May 8, 2001.

* cited by examiner

*Primary Examiner*—Matthew Anderson
*Assistant Examiner*—Tuan Pham
(74) *Attorney, Agent, or Firm*—Baker Botts L.L.P.

(57) ABSTRACT

Method for transmission of data between a master station and a slave station, and a data transmission system Data slots are interchanged in accordance with a time slot method between a master station (B) and the slave station (M1) in a data transmission system. The slave station (M1) may assume various operating modes during a connection. The operating mode of the slave station (M1) is identified by the data transmission system, and the slave station (M1) is addressed by the master station (M1), by means of a time addressing scheme which is dependent on the identified operating mode of the slave station (M1).

7 Claims, 3 Drawing Sheets

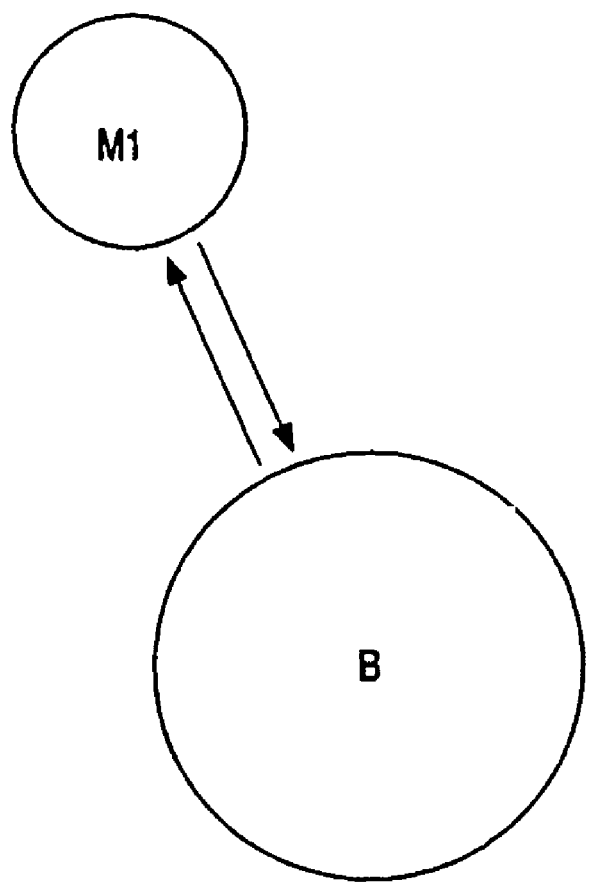
Fig. 1    (Prior art)
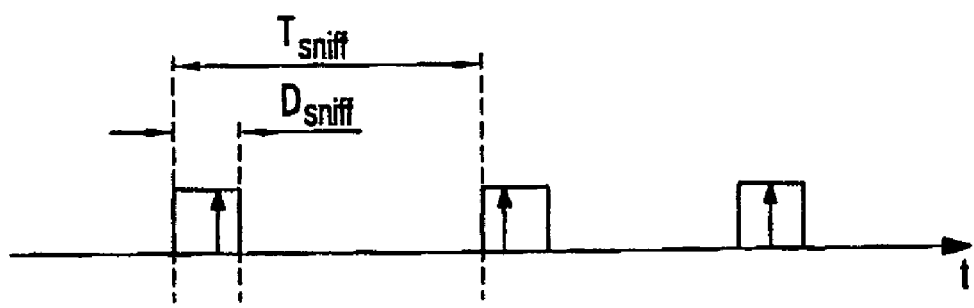
Fig. 2    (Prior art)

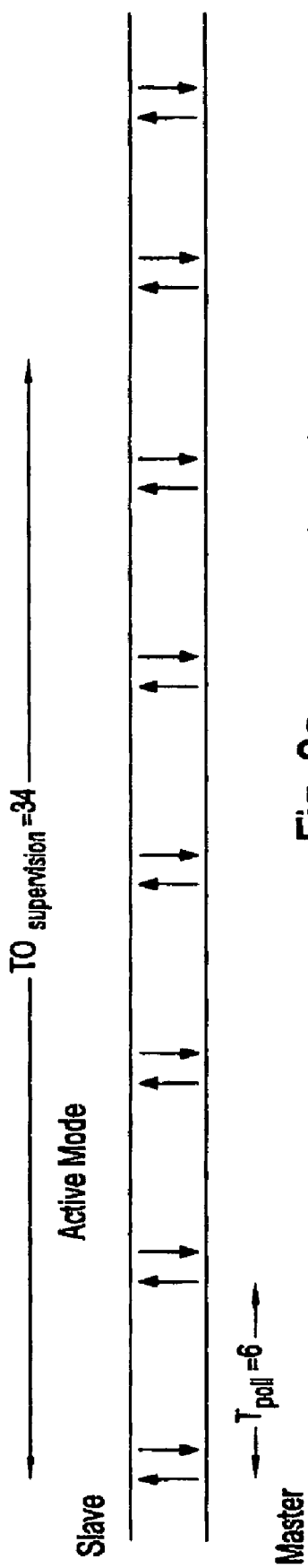
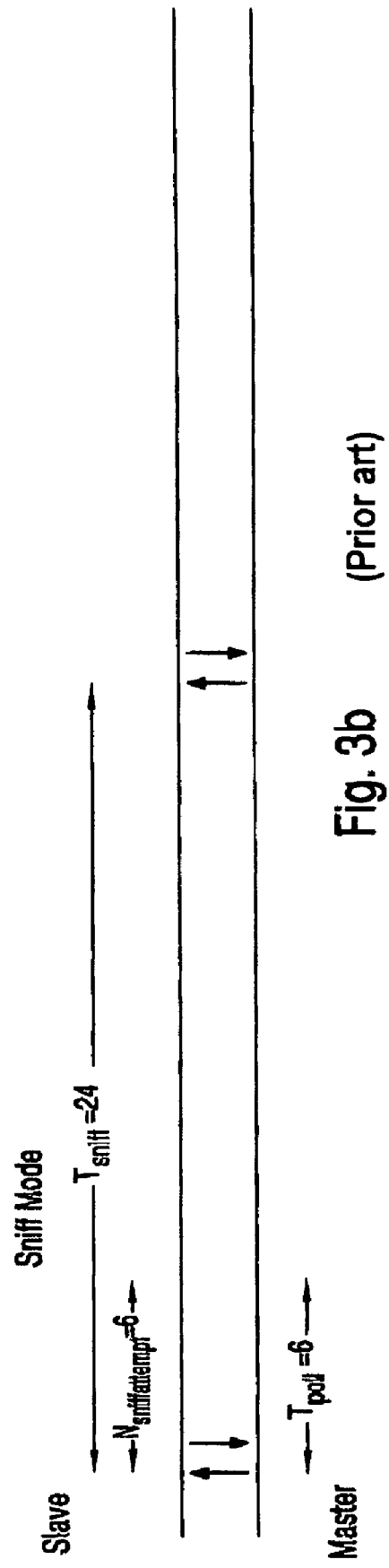

METHOD FOR TRANSMISSION OF DATA BETWEEN A MASTER STATION AND A SLAVE STATION, AND A DATA TRANSMISSION SYSTEM

CROSS REFERENCE TO RELATED APPLICATION

This application is a continuation of copending International Application No. PCT/DE02/02377 filed Jul. 1, 2002 which designates the United States, and claims priority to German application no. 101 39 342.3 filed Aug. 10, 2001.

TECHNICAL FIELD OF THE INVENTION

The present invention relates to a method in particular for wire-free transmission of data between a master station and a slave station, and to a data transmission system which has a master station and at least one slave station, between which data is interchanged, in particular by radio.

DESCRIPTION OF THE RELATED ART

Data transmission systems in which data is interchanged without wires over short distances of only a few meters between a master station and slave stations are referred to as pico networks. The frequencies which are available for data transmission in pico networks are gathered by the ISM frequency bands (industrial, scientific and medical). The ISM frequency bands are reserved for the radio-oriented use of a low transmission power, without any licensing. Pico networks which are based on the Bluetooth standard are known, which have a master station and a number of slave stations, with a number of slave stations being restricted to a maximum of seven active slave stations.

Data transmission from the master station to the slave stations is referred to as the downlink. The opposite case, of data transmission from the slave stations to the master station, is referred to as the uplink. Time slot methods are normally used for data transmission. In the case of time slot methods, time slots with a specific time duration are assigned to the downlinks and uplinks. The TDMA method (Time Division Multiple Access) is frequently used as a multiple access method for the time slot method, and the TDD method (Time Division Duplex) is used as a duplex method to form a bi-directional channel between the master station and the slave stations.

When a Bluetooth connection is in existence, there is always a fixed time interval within which a data burst is sent from the master station to a slave station at least once. This makes it possible for the slave station to send its payload data, or at least confirmation information that the data burst has been received, as a response data burst to the master station. This fixed time interval is the same for all of the slave station operating modes, and is referred to as the poll interval. The fact that a slave station which is in an active state responds at least once in each poll interval guarantees a minimum data transmission rate.

The slave stations in the Bluetooth data transmission system may be in various operating modes during a Bluetooth connection. In addition to an uninterrupted active state, it is also possible for a slave station to be in an operating mode with reduced activity. In a state such as this, the slave station is not active all the time, but only at times—during a predetermined active time interval. It is then possible for only one data burst to be sent from the master station to the slave station within the predetermined active time interval during the reduced activity period. If, for example, the access code in the data burst or response data burst is not identified, either by the master station or the slave station, and no further interchange of a data burst and of a response data burst without any errors takes place between the master station and the slave station within a predetermined time-out interval, either, then the Bluetooth connection is terminated. In the case of Bluetooth data transmission systems with two or more slave stations, connection interruptions between the master station and the slave stations can therefore occur relatively frequently.

SUMMARY OF THE INVENTION

The object of the invention is to provide a data transmission system which is based in particular on the Bluetooth standard but in which better connection stability is achieved between the master station and at least one slave station.

According to the invention, this object can be achieved by a method for transmission of data between a master station and at least one slave station in a data transmission system using a time slot method, in which the slave station is addressed repeatedly by the master station in order to transmit data or other information acknowledging the existence of the connection to the master station, by the master station sending data bursts to the slave station, comprising the following steps:
  identifying an operating mode of the slave station in the existing connection, and
  responding by the slave station in accordance with a time addressing scheme which is dependent on the identified operating mode of the slave station.

The data can be transmitted in accordance with the Bluetooth standard. The time response can be carried out such that an operating mode of the slave station with reduced activity is identified, and the number of data bursts sent by the master station to the slave station in an active time interval for the slave station is then increased. The slave station can be addressed a number of times successively by the master station in the active time interval as a function of the time slots which are free in the active time interval and the time slots for response are chosen variably. The method can be used in digital cordless communications systems or in computer-controlled entertainment systems, in particular computer-controlled games systems.

The object can also be achieved by a data transmission system, in particular a Bluetooth data transmission system, comprising a master station and at least one slave station between which data is interchanged, and in which the master station addresses the slave station, which has various operating modes, continuously repeatedly to transmit data or other information acknowledging the existence of a connection, by sending data bursts to the slave station, wherein a time addressing scheme with which the master station addresses the slave station is dependent on the identified operating mode of the slave station.

The time addressing scheme can be designed such that, when the slave station is in an operating mode with reduced activity, in particular a sniff mode, the number of data bursts which are sent from the master station to the slave station in an active time interval of the slave station is increased. The time addressing scheme can also be designed such that, when the slave station is in the active time interval of the mode with reduced activity, the slave station is addressed repeatedly and successively by the master station depending on the free time slots in the active time interval, and the free time slots for response can be selected in a variable manner.

The system can be used in digital cordless communications systems or in computer-controlled entertainment systems, in particular computer-controlled games systems.

A data transmission system according to the invention, in particular a Bluetooth data transmission system, has a master station and at least one slave station. Data bursts are interchanged between the master station and the slave station using a time slot method. The slave station is in this case addressed by the master station in order to transmit payload data or other information to acknowledge the existence of the connection. The slave station may in this case assume different operating modes in an existing Bluetooth connection.

According to the invention, when a connection exists, the operating mode of the slave station is identified, and the slave station is addressed by the master station in accordance with a time addressing scheme, which is dependent on the identified operating mode.

The advantage of the data transmission method according to the invention is that better connection stability and thus a reduction in the probability of a connection termination between the master station and the slave station in a connection can be achieved, since the slave station can now be addressed on the basis of the identified operating mode and as a function of its characteristic (for example active or deactive time intervals). The time addressing process is preferably carried out such that an operating mode of the slave station with reduced activity is identified, and the number of data bursts which are sent from the master station to the slave station in an active time interval of the slave station is then increased. This makes it possible not to unnecessarily terminate the connection between the master station and the slave station as the consequence of single or repeated non-identification of the access code in the data bursts which may be sent from the master station to the slave station or in the response data bursts which may be sent from the slave station to the master station.

It is also possible to provide for the slave station, when in the operating mode with reduced activity, in particular in the sniff mode in the Bluetooth data transmission system, to be addressed more than once successively by the master station, depending on the free time slots in the active time interval, within an active time interval during a period of reduced activity. This allows increased connection stability to be achieved between the master station and the slave station which is in the sniff operating mode. This also allows synchronization to be achieved between the master station and the slave station.

The data transmission system according to the invention may be used, for example, in short-range cordless communications systems, such as cordless telephones with two or more mobile parts. A further application relates to the interchange of data between a computer and peripherals, for example a mouse, a printer and a scanner.

Advantageous refinements of the invention are specified in the dependent claims.

BRIEF DESCRIPTION OF DRAWINGS

The invention will be explained in more detail in the following text with reference to the drawings, in which:

FIG. 1 shows a layout of a data transmission system according to the prior art, comprising a master station and a slave station;

FIG. 2 shows a schematic illustration of the time intervals when a slave station is in a sniff mode; and FIG. 3 shows a schematic illustration of the interchange of data bursts and response data bursts between a master station and a slave station, with the slave station in various operating modes, according to prior art;

DETAILED DESCRIPTION OF THE PREFERRED EMBODIMENTS

Figure 4A:
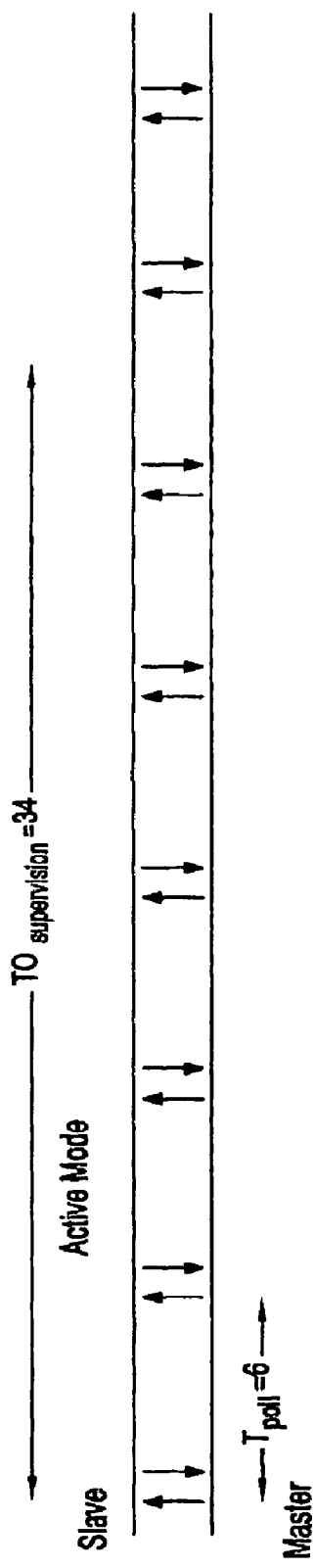
FIGS. 4a, 4b show a schematic illustration of the interchange of data bursts and response data bursts between a master station and a slave station, with the slave station according to the invention.

A known data transmission system (FIG. 1) has a master station B and, for example, one slave station M1. The master station B can transmit data bursts by radio to the slave station M1. The slave station M1 can likewise transmit response data bursts by radio to the master station B. A sequence of data which is transmitted without any interruption is referred to in the following text as the data burst or response data burst. In the data transmission system which is illustrated in FIG. 1, and which is referred to as a pico network, the master station B and the slave station M1 each have transmitting and receiving units.

The slave station M1 may be in various operating modes during the time period of a Bluetooth connection. For example, the mobile station M1 may be in the active mode or else in the sniff mode.

In this case, the expression active mode means the operating mode in which the slave station M1, which is referred to as the slave in the following text, is continuously involved in the communication in the pico network, that is to say without any time interruptions. The slave is in this case addressed periodically by the master station B which is referred to in the following text as the master. The periodic addressing of the slave by the master results in the slave being synchronized to the communication channel. The expression sniff mode means the slave operating mode in which the slave is not continuously involved in the communication in the pico network. The sniff mode is thus an operating mode in which the slave has reduced activity. When the slave is in the sniff mode, it is always active only for a specific time interval $D_{sniff} < T_{sniff}$ within a fixed time period $T_{sniff}$ (FIG. 2). The slave can be addressed by the master only in this time interval, and is treated by the master as an active slave. The arrow in this case symbolizes the slave being addressed once by the master.

FIGS. 3a and 3b show the communication between the master and slave during different operating modes of the slave. FIG. 3a in this case shows the communication between the master and the slave when it is in the active mode. The master addresses the slave within the poll interval $T_{poll}$. Addressing in this case means the sending of a data burst from the master to the slave within a time slot that is provided for this purpose, and is represented by an arrow in the direction of the slave. The poll interval $T_{poll}$ for an existing Bluetooth connection indicates that time within which a slave which is in the active mode must be addressed at least once. The master may address the slave more than once within the poll interval $T_{poll}$, but only a single response is guaranteed. The response gives the slave the opportunity to send its payload data as a response data burst. If there is no payload data, the slave sends a response data burst to confirm reception of the data burst that has originated from the master. If the slave has correctly received the data burst from the master, it thus in each case responds with a response data burst. This is represented by an arrow in the direction of the master. The time slots for transmission of the data burst from the master to the slave, and of the response data burst from the slave to the master each have a duration of 625 μs. A Bluetooth frame is in this case formed by two successive Bluetooth time slots, and thus has a time duration of 1.25 ms. The poll interval $T_{poll}$ may, for example, be defined to be six time slots, that is to say 3 frames. As is illustrated in FIG. 3a, when the slave is in the active mode, it is normally addressed regularly by the master with the repetition time period $T_{poll}$.

When the slave is in the sniff operating mode (FIG. 3b), the master can address the slave only during the slave's active time phase $D_{sniff}$ (FIG. 2). The active phase in the sniff mode is in this case, in the exemplary embodiment, six time slots $N_{sniffattempt}=6$ and thus, in the example chosen here, lasts for the same time as the poll interval $T_{poll}$.

In the prior art for Bluetooth data transmission as illustrated in FIGS. 3a and 3b, the operating mode in which the slave is operated is not identified, and the slave is therefore addressed only once by the master in the time interval $T_{poll}$ when the slave is in the sniff mode. The slave which is in the sniff mode is therefore also addressed only once by the master in the active phase $D_{sniff}$ in the entire sniff time period $T_{sniff}$. In the example, the sniff time period $T_{sniff}$ covers 24 time slots (FIG. 3b).

Since, when the slave is in the sniff mode, it can be accessed only once in each sniff time period $T_{sniff}$, the slave in the example can be accessed only twice by the master within a time period $TO_{supervision}$ which is referred to as the supervision time-out of a link supervision timer. The link supervision timer is in this case a monitoring instance for the Bluetooth connection, which monitors the existence of connections in the pico network. This connection-related timer is restarted whenever a data burst is correctly received by the slave and a response data burst that has been sent by the slave is correctly received by the master. If no such response data burst for a specific connection is received within the supervision time-out $TO_{supervision}$, it is assumed that the Bluetooth connection between the master and the slave has been terminated.

The Bluetooth specification stipulates that the sniff time period $T_{sniff}$ must be shorter than the supervision time-out $TO_{supervision}$. In the example, the supervision time-out $TO_{supervision}$ covers a time period of 34 time slots.

Thus, when the slave is in the sniff mode, the master in this case addresses it only once during the active phase $D_{sniff}$ of the sniff period, and thus only once in each sniff time period $T_{sniff}$. The slave is therefore addressed only twice within the supervision time-out $TO_{supervision}$ of the link supervision timer. The supervision timer is therefore triggered even when the master or the slave does not identify the access code in two successive response data bursts or data bursts, respectively. The connection between the master and the slave would therefore be terminated simply as a result of the access code for the data burst or the response data bursts not being identified twice.

Figure 4B:
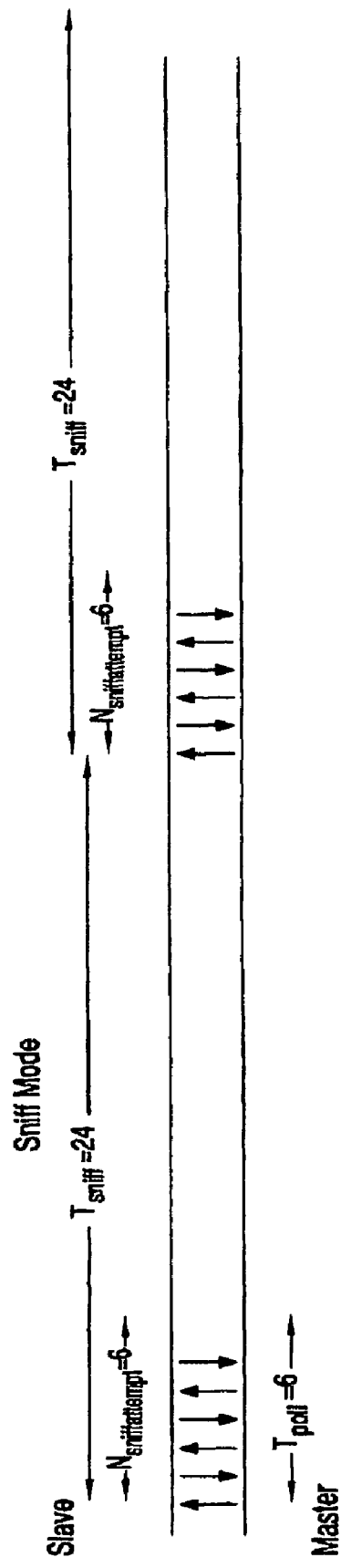

As an exemplary embodiment of the invention, FIG. 4a shows the communication between the master and a slave in the active mode, and FIG. 4b shows the communication between the master and the slave in the sniff mode. When the slave is in the active operating mode, then this operating mode is identified, and the communication between the master and the slave takes place in accordance with the schematic illustration. In the exemplary embodiment, this corresponds to the communication, as illustrated in FIG. 3a, between the master and the slave when it is in the active mode.

If the slave is in the sniff operating mode, or the slave changes from the active mode to the sniff mode (FIG. 4b), then this is identified by the data transmission system. In this case, the addressing of the slave once by the master in the active mode is increased to the slave being addressed by the master 3 times in the sniff mode. The guaranteed number of data bursts which are sent from the master to the slave within the time period $T_{poll}$ us thus increased when the slave's operating mode has changed. The additional data bursts which are sent from the master to the slave in the sniff mode are sent in the free time slots that are positioned in odd-numbered locations within the active time interval $D_{sniff}$ of the sniff time period $T_{sniff}$.

In the exemplary embodiment, these additional data bursts are sent from the master to the slave in the third and fifth time slots. If these data bursts are received correctly by the slave, then the slave sends response data bursts to the master in the free time slots 4 and 6.

It is also possible to provide a situation in which the free time slots within the time period $T_{poll}$ are not all used for transmission of data bursts from the master to the slave and for transmission of response data bursts from the slave to the master.

For example, it is possible to provide for the data bursts from the master to the slave to be sent in the free time slots 1 and 5 within the time period $T_{poll}$ and for the response data bursts from the slave to the master to be sent to the master within the free time slots 2 and 6 within the time period $T_{poll}$. The maximum number of data bursts which are sent from the master to the slave may be half as great as the total number of free time slots within the time period $T_{poll}$ which is available for data transmission. Since the number of data bursts which are sent from the master to the slave within the time period $T_{poll}$ of the active time interval $D_{sniff}$, that is to say the number of times the master addresses the slave, is increased, this also increases the probability of at least one response data burst being received correctly by the master. The probability of the link supervision timer being restarted within the supervision time period $TO_{supervision}$ thus also increases, which means that the connection between the master and the slave is maintained.

When the slave is in the active mode, it is also possible to provide for free time slots within the time period $T_{poll}$ to be used for transmission of data bursts and response data bursts. This allows improved data transmission when the slave is in the active mode.

We claim:

1. A method for transmission of data between a master station and at least one slave station in a data transmission system using a time slot method, in which the slave station is addressed repeatedly by the master station in order to transmit data or other information acknowledging the existence of the connection to the master station, by the master station sending data bursts to the slave station, comprising the following steps:

identifying an operating mode of the slave station in the existing connection by the master station, and addressing of the slave station by the master station in accordance with a time addressing scheme which is dependent on the identified operating mode of the slave station, wherein the addressing of the slave station is carried out such that when an operating mode of the slave station with reduced activity is identified, the number of data bursts sent by the master station to the slave station in an active time interval for the slave station is increased.

2. The method as claimed in claim 1, wherein the data is transmitted in accordance with the Bluetooth standard.

3. The method as claimed in claim 1, wherein the slave station is addressed a number of times successively by the master station in the active time interval as a function of the time slots which are free in the active time interval and the time slots for response are chosen variably.

4. The method as claimed in claim 1, wherein the method is used
in digital cordless communications systems or
in computer-controlled entertainment systems, in particular computer-controlled games systems.

5. A data transmission system, in particular a Bluetooth data transmission system, comprising a master station and at least one slave station between which data is interchanged, and in which the master station addresses the slave station, which has various operating modes, continuously repeatedly to transmit data or other information acknowledging the existence of a connection, by sending data bursts to the slave station, wherein a time addressing scheme with which the master station addresses the slave station is dependent on the identified operating mode of the slave station, wherein the time addressing scheme is designed such that, when the slave station is in an operating mode with reduced activity, in particular a sniff mode, the number of data bursts which are sent from the master station to the slave station in an active time interval of the slave station is increased.

6. The data transmission system as claimed in claim 5, wherein the time addressing scheme is designed such that, when the slave station is in the active time interval of the mode with reduced activity, the slave station is addressed repeatedly and successively by the master station depending on the free time slots in the active time interval, and the free time slots for response can be selected in a variable manner.

7. A digital cordless communications systems comprising a master station and at least one slave station between which data is interchanged, and in which the master station addresses the slave station, which has various operating modes, continuously repeatedly to transmit data or other information acknowledging the existence of a connection, by sending data bursts to the slave station, wherein a time addressing scheme with which the master station addresses the slave station is dependent on the identified operating mode of the slave station, and wherein the time addressing scheme is designed such that, when the slave station is in an operating mode with reduced activity, in particular a sniff mode, the number of data bursts which are sent from the master station to the slave station in an active time interval of the slave station is increased.

* * * * *